April 25, 1967 F. R. FLUHR 3,316,394
GENERALIZED ANALOG DIFFERENTIATOR
Filed Dec. 31, 1963 2 Sheets-Sheet 1

INVENTOR
FREDERICK R. FLUHR
BY James G. Murray AGENT
Richard G. Reed ATTORNEY

April 25, 1967     F. R. FLUHR     3,316,394
GENERALIZED ANALOG DIFFERENTIATOR

Filed Dec. 31, 1963     2 Sheets-Sheet 2

FIG. 2

INVENTOR
FREDERICK R. FLUHR
BY James G. Murray AGENT
Richard U. Reed ATTORNEY 3,316,394
GENERALIZED ANALOG DIFFERENTIATOR
Frederick R. Fluhr, 8716 E. Fort Foote Terrace,
Oxon Hill, Md. 20022
Filed Dec. 31, 1963, Ser. No. 334,953
7 Claims. (Cl. 235—183)

ABSTRACT OF THE DISCLOSURE

Electrical differentiating apparatus indicating relative rate of change of variable signal with respect to another quantity, not necessarily time. Capacitors are alternately connected to variable signal(s) and to different inputs of a differential amplifier.

---

Figure 1:
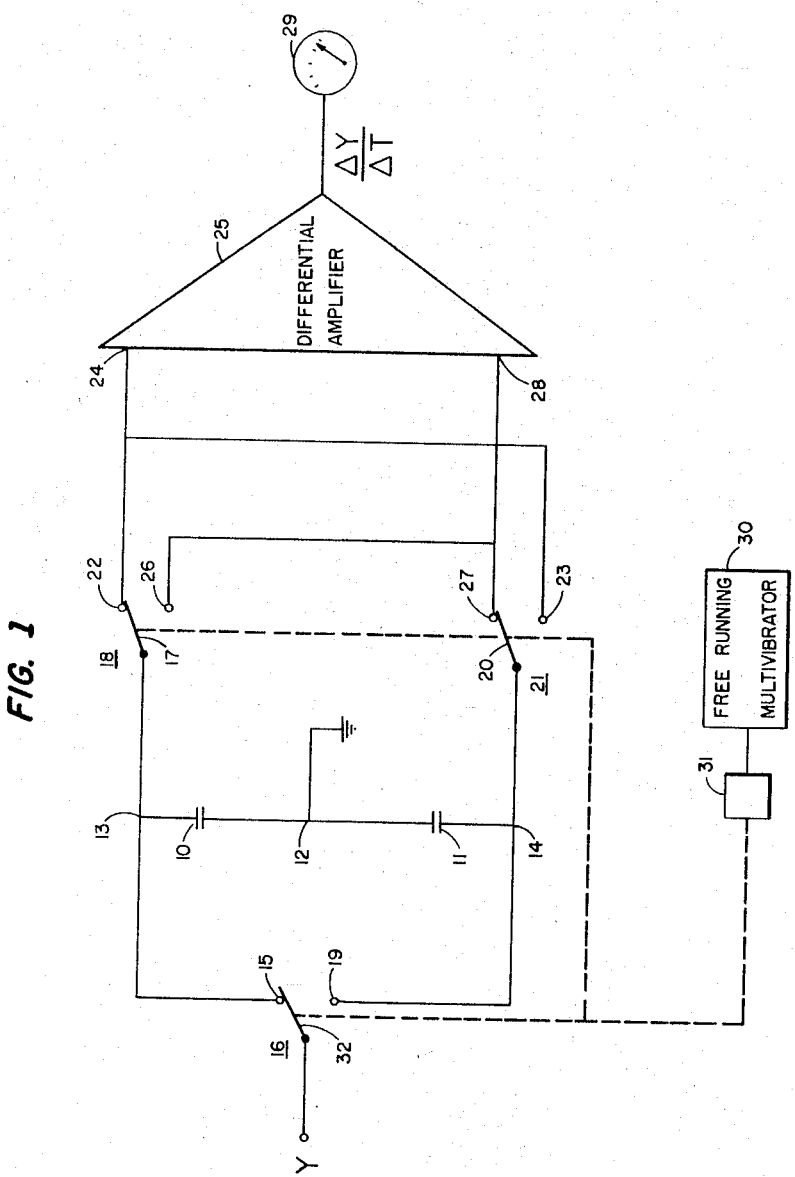

The invention described herein may be manufactured and used by or for the Government of the United States of America for governmental purposes without the payment of any royalties thereon or therefor.

The present invention relates to differentiator devices and in particular to electrical differentiator devices which do not require that time be included as one of the variables.

When designing an electronic analog computer, the designer is frequently able to arrange the computer circuitry to utilize either integrators or differentiators which operate on a single variable which is time dependent. A factor influencing the designer's selection is the inherent characteristic of an integrator to smooth out electronic noise as contrasted to the tendency of a differentiator to exaggerate irregularities and consequently produce spurious responses from low level electronic noise which may obscure the desired result. It has also been recognized that, when operating on a function which is discontinuous, and in unfavorable contrast with the slowly varying integrator output, the output of a differentiator has an inherent tendency to include very high frequency components which, for fidelity of transmission, require a wide band output channel. For these reasons the use of differentiators in computers is generally avoided.

There are, however, some circumstances wherein the use of differentiators cannot be conveniently avoided. For example, in the computing operations associated with tracking systems, some of the changes which occur are functions of variables other than time. In these circumstances, when a rate of change is required, it is more readily obtainable by a differentiator than by an integrator.

It is, therefore, an object of this invention to provide an electrical differentiator.

Another object of this invention is to provide an electrical differentiator which is capable of differentiating a function with respect to time.

Yet another object of this invention is to provide an electrical differentiator which is capable of differentiating a function with respect to a variable which can be other than time.

The exact nature of this invention, as well as other objects and advantages thereof, will be readily apparent from consideration of the following specification relating to the annexed drawings in which:

FIG. 1 is a block diagram of an embodiment of the invention which is capable of differentiating a function with respect to time, and FIG. 2 is a block diagram of an embodiment of the invention which is capable of differentiating a function with respect to a variable which can be other than time.

This invention, in brief, provides an output signal which is the differential of an input signal. The output signal is obtained across two capacitors which are connected to ground and are alternately connected by switching means to the input signal. In obtaining the differential with respect to time, the switching is performed at fixed time intervals. In obtaining the differential with respect to a variable other than time, the switching is controlled to occur after predetermined incremental changes in the independent variable and the differential output signal is modified in polarity in accordance with the sense of the incremental change in the independent variable.

Referring now to FIG. 1, the capacitors 10 and 11 or equivalent storage devices are connected, at a common junction 12, to ground. The other ends of these capacitors are connected to junctions 13 and 14, respectively. Junction 13 is connected in the lead extending from the terminal 15 of s.p.d.t. switch 16 to the blade 17 of switch 18. Junction 14 is connected in the lead extending from the terminal 19 of switch 16 to the blade 20 of switch 21. Terminal 22 of switch 18 and terminal 23 of switch 21 are connected to input terminal 24 of differential amplifier 25. The terminal 26 of switch 18 and terminal 27 of switch 21 are connected to the other input terminal 28 of differential amplifier 25, the output of which is connected to meter 29. Switches 16, 18 and 21 are controlled by the free running multivibrator 30 through mechanism 31 to alternately and concurrently connect, for a predetermined period of time, the blade 32 of switch 16 to terminals 15 and 19; the blade 17 of switch 18 to terminals 22 and 26 and the blade 20 of switch 21 to terminals 27 and 23. While mechanical switching has been illustrated for convenience, it is obvious that electronic switching could also be utilized. The blade 32 of switch 16 is connected to receive the variable signal Y which varies at a significantly slower rate than the frequency of multivibrator 30 and, therefore, the switching frequency of switches 16, 18 and 21. Further, the switching frequency and the impedance of the source of signal Y should be such as to allow capacitors 10 and 11 to become fully charged.

In the apparatus of FIG. 1, the differential amplifier 25 provides an output related in polarity and magnitude to the difference of the potentials at the input terminals 24 and 28. The output of differential amplifier 25 is connected to the meter 29, which could be of the type which indicates positive and negative potentials on opposing sides of a zero center, and which provides an indication related to the value of $\Delta Y/\Delta t$, that is the differential with respect to time of the variable input Y. The multivibrator 30 and mechanism 31 change the positions of switches 16, 18 and 21 every increment of time $\Delta t$ to alternately connect input Y to one of the capacitors 10 and 11 and to the input 24 of differential amplifier 25 and to connect the other input 28 of differential amplifier 25 to the other of the capacitors 10 and 11 which has stored therein the value of Y associated with the previous time increment. In other words, the switches 16, 18 and 21 are connected and controlled so that input 24 of differential amplifier 25 is maintained at the present potential of the variable input Y and the input 28 of differential amplifier 25 is maintained at the potential of the variable input Y in the previous $\Delta t$ increment. The variation of Y, that is $\Delta Y$, in the time increment $\Delta t$, is, of course, an approximation of the instantaneous time differential $dY/dt$. The accuracy of this approximation is obviously improved as the increment $\Delta t$ is made smaller, or in other words, as the frequency of multivibrator 30 is increased.

The apparatus of FIG. 1, which provides an indication of the differential of variable Y with respect to time, can be modified as illustrated in FIG. 2 to provide the generalized differential of variable Y, that is with respect to a variable X, which can be a variable other than time.

In the apparatus of FIG. 2, the capacitors 10 and 11, the differential amplifier 25 and the switches 16, 18 and 21 cooperatively function in a manner similar to that already described in relation to FIG. 1. However, whereas in the apparatus of FIG. 1 the time related multivibrator 30 controls the switches 16, 18 and 21, in the apparatus of FIG. 2, these switches are controlled by components, presently to be described, which are responsive to variations of a variable X.

The variable signal X is connected as an input to the blade 50 of switch 51. Capacitors 52 and 53 are connected on one end at a common junction 54 to ground and on the other end to junctions 55 and 56 respectively. Junction 55 is connected in the lead extending from the terminal 57 of switch 51 to the blade 58 of switch 59. Junction 56 is connected in the lead extending from the terminal 60 of switch 51 to the blade 61 of switch 62. Terminal 63 of switch 59 and terminal 64 of switch 62 are connected to input terminal 65 of differential amplifier 66 which is similar to differential amplifier 25. The terminal 67 of switch 59 and terminal 68 of switch 62 are connected to the other input terminal 69 of differential amplifier 66. The output of differential amplifier 66 is connected to threshold circuit 70 and through inverter 71 to a threshold circuit 72, which is similar to threshold circuit 70 in that both of circuits 70 and 72, which may be any of the familiar triggering, comparator and similar circuits, generate a pulse when the input potential reaches a predetermined value. The OR gate 73 is connected to receive these pulses and to energize the switching mechanism 74 which simultaneously changes the position of switches 16, 18, 21, 51, 59 and 62 on each occurrence of a pulse from either of the threshold circuits 70 or 72. Switch control 75 is also connected to receive the output pulses of threshold circuits 70 and 72 and controls the position of switch 76 in accordance with whether threshold circuit 70 or 72 is energized. The output of differential amplifier 25 is either connected directly to meter 77, which is similar to meter 29, or is connected through inverter 78 to meter 77, depending upon the position of switch 76.

In the apparatus of FIG. 2, the meter 77 indicates the magnitude and sense of the differential of the variable Y with respect to the variable X, that is the value of $\Delta Y/\Delta X$. The switches 16, 18, 21, 51, 59 and 62 are controlled, by means hereinafter described, to simultaneously change position whenever the variable X changes by a predetermined increment $\Delta X$. In a manner similar to the previously described functioning of the apparatus of FIG. 1, the switches 16, 18 and 21 alternately connect the variable signal Y to one of the capacitors 10 and 11 and to the input 24 of differential amplifier 25 and the other input 28 of differential amplifier 25 to the other of the capacitors 10 and 11 which has stored therein the value of signal Y associated with the previous $\Delta X$ increment. The output of differential amplifier 25 is indicative of the change of the value of variable signal Y from the previous $\Delta X$ increment to the present value, a quantity which can be symbolized as $|\Delta Y/\Delta X|$ where $|\Delta X|$ is indicative that the sense of the output of differential amplifier 25 is independent of the sense of the $\Delta X$ increment.

In an analogous manner, the switches 51, 59 and 62 alternately connect the variable signal X to one of the capacitors 52 and 53 and to the input 65 of differential amplifier 66 and the other input 69 of differential amplifier 66 to the other of the capacitors 52 and 53 which has stored therein the value of signal X associated with the previous $\Delta X$ increment. The output of differential amplifier 66 is a measure of the change of the value of variable signal X from that of the previous $\Delta X$ increment to the present value. When the output of differential amplifier 66 reaches a predetermined value, in either a positive or negative sense, one or the other of threshold circuits 70 and 72 will be triggered to generate a pulse output. Which one of these circuits is triggered is determined by the sense of the differential amplifier 66 output. The pulse output of either of the circuits 70 and 72 is passed by the OR gate 73 to energize switching mechanism 74 to change the position of switches 16, 18, 21, 51, 59 and 62. The outputs of threshold circuits 70 and 72 are also received by switch control 75 which, depending upon the trigger circuit energized, positions the switch 76 to pass the output of differential amplifier 25 either directly to the meter 77 or to the meter through the inverter 78. In this manner the sense of the $\Delta X$ increment is incorporated into the output $|\Delta Y/\Delta X|$ of differential amplifier 25 so that the meter 77 indicates the sense and the magnitude of $\Delta Y/\Delta X$, that is, the differential of variable signal Y with respect to variable signal X. The quantity $\Delta Y/\Delta X$ is an approximation of the instantaneous differential $dY/dX$. The accuracy of this approximation is obviously improved as the increment $\Delta X$ is made smaller, which can be accomplished either by increasing the gain of differential amplifier 66 or decreasing the triggering threshold of circuits 70 and 72 by controls 79 and 80 which can be manually adjusted or controlled by computer means which are not a part of this invention.

The invention has been disclosed in the embodiment of FIG. 1 as an apparatus capable of providing an output signal which is the differential with respect to time of a variable input signal and in the embodiment of FIG. 2 as an apparatus capable of providing an output which is the differential of one variable input signal with respect to another variable input signal.

Obviously many modifications and variations of the present invention are possible in the light of the above teachings. For example, the switching means have been disclosed, for convenience of illustration, as being of an electromechanical nature, but could obviously be of any well-known electronic type. It is therefore to be understood, that within the scope of the appended claims, the invention may be practiced otherwise than as specifically described.

What is claimed is:

1. Apparatus for differentiating a variable signal comprising:
   first and second storage devices;
   a differential amplifier having first and second inputs and
   switching means which alternately connect said variable signal to one and then the other of said first and second storage devices and to one input of said differential amplifier and to connect the other input of said differential amplifier alternately to the first or second storage device not connected to said variable signal.

2. Apparatus for providing the differential with respect to time of a variable signal comprising:
   first and second storage devices;
   a differential amplifier having first and second inputs;
   switching means which alternately connect said variable signal to one and then the other of said first and second storage devices and to one input of said differential amplifier and to connect the other input of said differential amplifier alternately to the first or second storage device not connected to said variable signal, and
   control means connected to said switching means to change the position of said switching means at predetermined time intervals.

3. Apparatus as set forth in claim 2 wherein said control means includes a multivibrator.

4. Apparatus as set forth in claim 3 which further includes an indicator connected to said differential amplifier to indicate the magnitude and sense of the difference between said differential amplifier inputs.

5. Apparatus for providing the differential of one variable signal with respect to a second variable signal comprising:
   first and second storage devices;

a differential amplifier having first and second inputs;

switching means which alternately connect said one variable signal to one and then the other of said first and second storage devices and to one input of said differential amplifier and to connect the other input of said differential amplifier alternately to the first or second storage device not connected to said one variable signal, and control means connected to receive said second variable signal and connected to said switching means to change said switching means upon a predetermined change in the magnitude of said second variable signal.

6. Apparatus as set forth in claim 5 wherein said control means comprises:

third and fourth storage devices;

a second differential amplifier having first and second inputs;

second switching means which alternately connect said second variable signal to one and then the other of said third and fourth storage devices and to one input of said second differential amplifier and to connect the other input of said second differential amplifier alternately to the third or fourth storage device not connected to said second variable signal, and second control means connected to said second differential amplifier and to said first recited switching means and to said second switching means to change the position of said first recited switching means and said second switching means whenever the difference in the inputs of said second differential amplifier attains a predetermined value.

7. Apparatus as set forth in claim 6 and further including:

an indicator;

an inverter;

a circuit including a switch to connect said indicator either directly to said first recited differential amplifier or to said first recited differential amplifier through said inverter depending upon the switch position, and switch control means connected to said switch and to said second control means to position said switch in response to the sense of the predetermined value of the difference of the inputs of said second differential amplifier.

References Cited by the Examiner

UNITED STATES PATENTS

| | | | |
|---|---|---|---|
| 2,753,503 | 7/1956 | Wideroe. | |
| 2,907,902 | 10/1959 | McIntosh et al. | 320—1 X |
| 3,050,253 | 8/1962 | Fluegel | 235—183 |
| 3,141,969 | 7/1964 | Brendle | 235—183 X |
| 3,249,748 | 5/1966 | Fluhr | 235—183 |

MALCOLM A. MORRISON, *Primary Examiner.*

I. KESCHNER, *Assistant Examiner.*